(No Model.)
P. NADIG.
SCREW DRIVER.
No. 267,709. Patented Nov. 21, 1882.
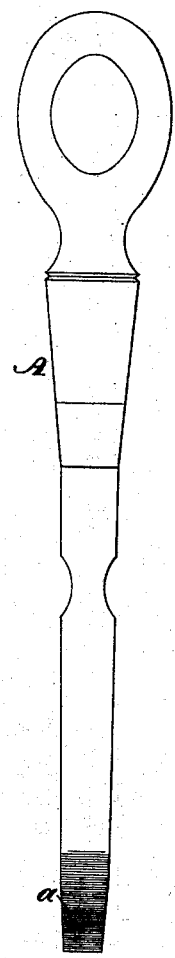
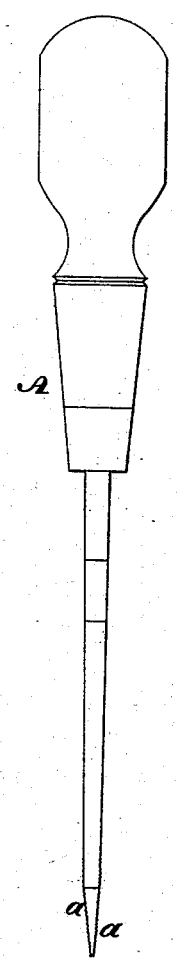
WITNESSES:
A. P. Grant,
W. F. Kircher
INVENTOR:
Phillip Nadig,
BY John A. Wiedersheim
ATTORNEY.
N. PETERS. Photo-Lithographer, Washington, D. C.

United States Patent Office.

PHILLIP NADIG, OF ALLENTOWN, PENNSYLVANIA.

SCREW-DRIVER.

SPECIFICATION forming part of Letters Patent No. 267,709, dated November 21, 1882.

Application filed July 28, 1882. (No model.)

*To all whom it may concern:*

Be it known that I, PHILLIP NADIG, a citizen of the United States, residing at Allentown, in the county of Lehigh, State of Pennsylvania, have invented a new and useful Improvement in Screw-Drivers, which improvement is fully set forth in the following specification, and accompanying drawings, in which—

Figures 1 and 2 are side elevations of the screw-driver embodying my invention.

Similar letters of reference indicate corresponding parts in the two figures.

The object of my invention is to prevent the slipping of a screw-driver from the nick or slot of the head of a screw, and increase the strength of the point or plate of the driver.

The invention consists in providing the point or working end of the driver with a biting-surface, which engages with the wall of the nick or slot of the screw in such manner as to interlock therewith and cause a firm connection of the parts.

Referring to the drawings, A represents a screw-driver, which, excepting as far as my invention relates to it, is of usual form and construction. On one or both sides of the point portion or working end of the shank of the driver are serrations, roughenings, or file-cuts *a*, forming biting-surfaces, which, when said point or end is inserted in the nick or slot of the head of the screw and the driver is rotated, engage with the metal of the walls of said nick or slot and interlock therewith, thus causing the driver to take firm hold of the screw and be prevented from slipping therefrom, the advantages of which will be apparent to and appreciated by those who have used the smooth-sided screw-driver and had it constantly slip from the head of the screw.

The surfaces *a* may also be used as files, thus adding to the convenience of the tool. Furthermore, as the driver does not slip, the taper of the working point or end may be greatly increased over that of a smooth-point driver, thus adding strength and rigidity to the driver, the serrations also adding further strength and rigidity thereto.

Having thus described my invention, what I claim as new, and desire to secure by Letters Patent, is—

A screw-driver provided at the point portion or working end of the shank with file-cuts *a*, forming a biting-surface, substantially as and for the purpose set forth.

PHILLIP NADIG.

Witnesses:
EDWARD RUHE,
THOS. P. WILSON.